(No Model.)
J. T. BROWN.
HORSE HAY FORK.
No. 319,671. Patented June 9, 1885.
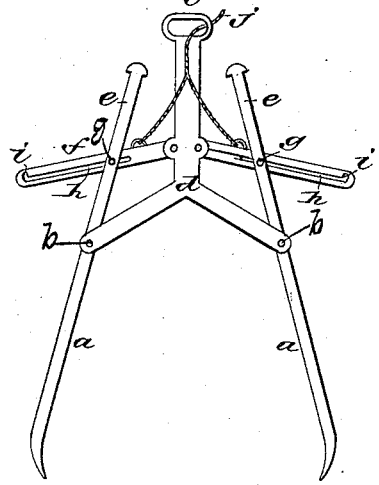
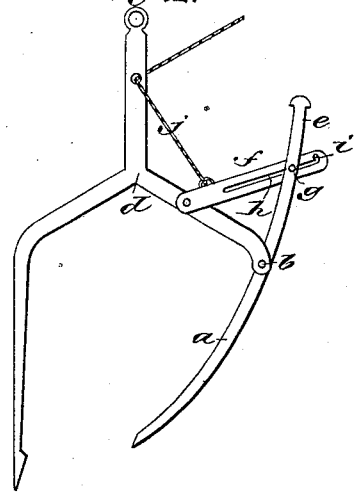
WITNESSES:
Otto Beyer
C. Sedgwick
INVENTOR:
J. T. Brown
BY Munn & Co.
ATTORNEYS.

UNITED STATES PATENT OFFICE.

JOHN TAYLOR BROWN, OF OTTAWA, ILLINOIS.

HORSE HAY-FORK.

SPECIFICATION forming part of Letters Patent No. 319,671, dated June 9, 1885.

Application filed June 3, 1884. (No model.)

*To all whom it may concern:*

Be it known that I, JOHN TAYLOR BROWN, of Ottawa, La Salle county, Illinois, have invented a new and useful Improvement in Horse Hay-Forks, of which the following is a full, clear, and exact description.

My invention consists of the tines, or one of them, pivoted to the lifting crotch-bar suspended from the hoisting-rope, said tines extending above the pivot to form levers, whereby the operator may so manipulate the tines as to cause them to grip the hay before the tines are raised by the hoisting-rope, together with latches to secure the tines and maintain the grip while the load is being hoisted.

Reference is to be had to the accompanying drawings, forming part of this specification, in which similar letters of reference indicate corresponding parts in both the figures.

Figure 1 is a side elevation of the fork in which the tines are pivoted to a rigid lifting-crotch, and Fig. 2 is a side elevation of a fork in which one of the tines only is pivoted to the crotch, and the other is formed rigid with the crotch.

I pivot one or both of the tines $a$, preferably both, to the lifting-crotch $d$, and extend the tines upward above the pivots to form lever-handles $e$, by which the attendant may swing the tines together to grip the hay before the pull of the hoisting-rope begins, and secure them by the stop-latches $f$, pivoted to the crotch for the purpose. These latches are connected to the levers by a stud-pin, $g$, and slot $h$, the slot allowing the stud-pin to shift along to the outer end of the slot, and having a notch, $i$, into which the stud-pin catches and locks the tines. I connect the trip-cord $j$ to these latches, to pull the latches $f$ up from the stud-pins to trip the tines and release the load.

It will be readily seen that with this improvement in hay-forks a greater quantity of hay can be taken up and will be more securely held than as ordinarily arranged.

Having thus described my invention, I claim as new and desire to secure by Letters Patent—

1. In a horse hay-fork, the combination, with the crotch-bar, of a tine pivoted to an arm of said crotch-bar and extended upward to within a short distance of the upper end of the crotch-bar to form a handle, and provided with a pin about equidistant between the upper end and the pivot, and a slotted arm pivoted to the crotch-bar and receiving said pin in its slot, substantially as and for the purpose set forth.

2. In a horse hay-fork, the combination, with the crotch-bar provided with an eye in its upper end, and with fixed divergent arms or prongs at its lower end, of the tines pivoted to the outer free ends of said prongs or arms, and extending upward nearly to the upper end of said bar to form handles, and each provided with a pin about equidistant between its upper end and its pivot, arms pivoted to said crotch-bar and provided with slots and notches adapted to engage said pins, and a trip-cord connected to said slotted arms and passing through the eye in said crotch-bar, substantially as and for the purpose set forth.

JOHN TAYLOR BROWN.

Witnesses:
 THOS. C. TULLERTON,
 W. BUSHNELL.